United States Patent Office 2,868,779
Patented Jan. 13, 1959

2,868,779

PROCESS FOR THE PURIFICATION OF STREPTOMYCIN

Charles R. Bartels, Westfield, Wilbur L. Bryan, Belle Mead, and Bernard Berk, Westfield, N. J., assignors to Olin Mathieson Chemical Corporation, New York, N. Y., a corporation of Virginia No Drawing. Application August 28, 1956
Serial No. 606,546

11 Claims. (Cl. 260—210)

This invention relates to the purification of streptomycins and their isolation in high yield from fermentation broths.

As disclosed in our application Serial No. 342,722, filed March 16, 1953, and now Patent No. 2,765,302, granted October 2, 1956, we have found that calcium, magnesium, and other polyvalent cations can be removed from the filtrate of a streptomycin-containing broth by adsorbing the filtrate on a first cation exchange resin, eluting the adsorbed streptomycins therefrom, adding to the eluate an alkaline-earth-metal sequestering agent in quantity at least sufficient to sequester the alkaline-earth-metal ions, adsorbing the streptomycins from the resulting solution on a second cation exchange resin, and then eluting a purified streptomycin from said second cation exchange resin. We have now found that this process is equally applicable when the whole streptomycin-containing broth, in contrast to the previously used broth filtrate, is employed as the feed for the first cation exchange resin, and that by so operating the previously required initial steps of acidifying the whole broth, filtering, recovering the filtrate, and neutralizing the same are obviated.

An object of this invention, therefore, is to bind calcium, magnesium, and other polyvalent cations by means of an alkaline-earth-metal sequestering agent in the eluate of a streptomycin, resulting from the adsorption of the streptomycin from a whole broth containing the same on a cation exchange resin and elution therefrom.

This object of the invention may be attained by means of a multi-stage separation which comprises: (1) adsorbing streptomycin from a whole streptomycin-containing broth on a first cation exchange resin (especially a resin deriving its exchange capacity essentially from carboxylic acid groups); (2) eluting the streptomycin from the resin; (3) adding an alkaline-earth-metal sequestering agent to the eluate in quantity substantially sufficient to sequester the inorganic polyvalent cations (especially calcium and magnesium); (4) adsorbing the streptomycin from the resulting solution on a second cation exchange resin (especially a resin deriving its exchange capacity essentially from carboxylic acid groups); (5) eluting the streptomycin; and (6) recovering the purified streptomycin from the eluate.

More specifically, the multi-stage process may be carried out as follows: A whole streptomycin-containing broth is passed through a column (or series of columns) containing a cation exchange resin in its salt form (e. g., sodium cycle), until the column is substantially saturated with streptomycin. [By the term "whole streptomycin-containing broth" is meant a streptomycin fermentation broth which has not been subjected to treatment for the separation of any component thereof, either solid or liquid. In other words, the whole broth is the fermentation broth directly as received from the fermenter, hence containing mycelium, spores, unused nutrients and streptomycin, as well as other components originally present in the medium or formed in the fermentation thereof.] Since the whole broth as received from the fermenter is at a suitable pH for cation exchange, no adjustment of pH is necessary, as required in processes employing a broth filtrate. However, the culture may be acidified and then neutralized before contacting with the cation exchange resin. This modification aids in the recovery of streptomycin from the solids in the whole broth but is not a necessary or preferred mode of operation.

Suitable cation exchange resins for use in the process of this invention include those resins (preferably of the weak carboxylic acid type) priorly used for the adsorption of streptomycin and other basic antibiotics. Examples of such resins are those described in the following U. S. patents: 2,319,359; 2,333,754, 2,340,110; and 2,340,111. These resins are sold under various trademark designations, inter alia, as: Alkalex; Amberlite IRC-50; Duolite CS 100; Permutit 216; Permutit H-70; and Wofatit C. Especially preferred is the resin sold under the trademark Amberlite IRC-50.

The mycelium and other culture solids, as well as most of the culture liquid impurities, are not adsorbed by the resin and are separated from the column as spent whole broth.

Since the whole broth has a viscosity greater than the filtered broths previously used, as it passes through the resin it will tend to carry particles of resin with it. It is, therefore, desirable to equip the column containing the resin with some means to separate these resin particles from the whole broth effluent, which has been stripped of streptomycin. This separation may be done by various means, such as by centrifuging and filtering. However, the preferred method of separating resin particles from the stripped whole broth involves the use of a screen (hereinafter referred to as "column screen") fine enough to retain the particles of resin but coarse enough to permit free flow therethrough of the solid components in the stripped broth. This screen, although referred to as the column screen, may be positioned internally in the column between the resin bed and the outlet in the column, or externally of the column anywhere along the flow path of the stripped broth after it leaves the resin and the column. The optimum size for the openings in the screen are determined by the size of the solid components of the whole broth and hte particle size of the resin. If a commercial cation exchange resin of usual particle size is used and the whole broth and resin are prescreened in the manner indicated hereinafter, a column screen of about 50–80 mesh is particularly useful, a screen of about 60 mesh being preferred.

Although it is not entirely necessary for a successful process, it is desirable to subject the whole broth, prior to its introduction into the cation exchange column, to a prescreening whereby large solid particles in the whole broth are removed. This step removes particles too large to pass through the column screen. A screen having a fineness of at least 80 mesh (preferably 100 to 200 mesh, and especially about 100 mesh) is used for this treatment, the solids trapped thereby being separately removed. The screen may be vibrated, as by rocking or agitating, to assist in this initial separation.

The resin may also be prescreened before being placed in the column, so that all particles of size smaller than the column screen openings are removed. For a column screen of 50–80 mesh, a screen of about 40 mesh may be used for prescreening the resin. This is done to prevent plugging of the screen by fines but is not essential, since the screen, if it were to become clogged, may be freed of particles in situ by agitation (as more fully described hereinafter), vibration, backwashing with water or acid, or other means well known in the art.

In order to more fully prevent the resin particles from being forced by the flow of the feed against the column screen, thereby clogging it, an agitator (preferably of the turbine type) may be placed in the cation exchange column so as to drive resin particles impinging thereon away from the screen. In an upflow process, the shaft connecting the blades of the agitator with a power source for rotating the same can be passed through a bushing in the column screen at the top of the cation exchange column, the blades being positioned between the column screen and the resin bed, preferably within a few inches below the screen. In a downflow process, the shaft can be passed through the top of the column so that the blades are positioned between the bottom of the resin bed and the screen at the bottom of the column, preferably within an inch of the screen. Other means may be substituted for the agitator to serve the same function. For example, the column screen may be equipped with a vibrator so as to shake loose any resin particles imbedded therein; or a jet of liquid, such as water, may be caused to play on the screen to dislodge any particles adhering thereto. The screen may also be backwashed with an acid, such as dilute nitric acid, which reduces the particle size of the resin due to elution of the streptomycin therefrom, thus freeing the embedded particles from the screen.

This step of the process, as well as subsequent adsorption steps more fully described hereinafter, may be carried out with one or more columns. If a plurality of columns are used, they are connected in series so that the effluent from the first column becomes the feed of the second in the usual setup. Each column is then processed until it is saturated with streptomycin. The column is then by-passed, washed with water (preferably deionized water), eluted with an acid, such as nitric acid, hydrochloric acid, sulfuric acid, or other acids well known in the art to desorb the streptomycin from the cation exchange resin as the salt of the eluting acid. The column is then regenerated with known regenerating bases or salts, such as caustic, ammonia, potassium hydroxide, etc. The regenerated column may then be re-inserted into the series of columns as the last member thereof, thus permitting a continuous process.

The whole broth may enter the column either upflow or downflow, the screen and agitator (if used) being positioned near the top or bottom of the column, respectively. This step in the process is operative with either type of flow, but an upflow method is preferred, since under such operating conditions gravity tends to prevent the resin fines from clogging the screen. If the process is conducted downflow, an agitator, screen vibrator or other means should be incorporated in the column for best results, to remove and prevent particles from plugging the screen.

Although the use of ion exchange columns, as described in the above step of the process as well as subsequent steps, is preferred, the process may be carried out using tanks or other vessels instead of columns. One such process involves a counter-current type extraction wherein both the resin and feed move through the system in opposite directions. Although the process is preferably carried out using three or more tanks to insure complete recovery of the streptomycin from the whole broth, for simplicity the process will be described using two tanks. The process involves introducing fresh resin and partially spent whole broth, which has been previously contacted with partially spent resin, into one tank (preferably equipped with an agitator); screening the resin-whole broth mixture through a vibrating screen; feeding the screened resin to a second tank (also preferably equipped with an agitator) where it is contacted with fresh broth; screening the resin-while broth mixture from said second tank through a second vibrating screen; passing the broth separated by said second screen to said first tank; and eluting the resin separated by the second screen to recover the streptomycin absorbed thereon. The stripped resin is then regenerated and introduced into the first tank. The broth from said first tank which has been stripped of streptomycin is discarded. A plurality of tanks (three, four or more) may be used in the same manner to insure complete recovery of the streptomycin content of the whole broth. The screen used in this and other processes involving external screens is similar to the column screen used in conjunction with the cation exchange columns, both as to mesh and size.

The tanks may also be used as vessels in a concurrent batch or continuous process in the following manner. A feed of fresh whole broth and fresh resin is introduced into a first tank equipped with an agitator. The mixed whole broth and resin is then separated by means of a vibrating screen into a partially spent whole broth filtrate and a partially spent resin residue. The resin is reintroduced into the first tank, wherein it is contacted with a second feed of fresh whole broth. The partially spent whole broth from the first feed is introduced into a second tank of fresh resin and mixed therewith. The resin and whole broth in the second tank are separated by means of a second vibrating screen. The resin is reintroduced into the second tank, and the nearly spent whole broth is introduced into a third tank containing fresh resin. The process is continued until the whole broth leaving the last tank of the series is totally stripped of streptomycin and until the resin in the first tank is totally loaded. The resin in the first tank is then eluted with acid, the streptomycin salt recovered and the resin regenerated. The process may be rendered continuous by introducing the tank containing the newly regenerated resin as the last member of the series.

Since the viscosity of the broth effects its carrying power, viscous broth desirably should be diluted with water prior to introduction into the cation exchange column. The optimum range of viscosity for the feed is less than 60 centipoises. Ordinary streptomycin broths generally fall within the range, but more viscous broths should be diluted with an amount of water necessary to reduce the viscosity to less than 60 centipoises.

In the second step of the process, the exchange columns, substantially saturated with streptomycin, are washed with deionized water, and the adsorbed streptomycin is eluted with a dilute acid, such as a mineral acid (e. g., hydrochloric acid, sulfuric acid, and optimally nitric acid), preferably at a pH of 1 to 3. The resulting solution is then preferably adjusted to a pH about 8, optimally 9.0 to 9.5, with sodium carbonate or an equivalent neutralizing agent, and filtered.

To the filtrate is added a chelating agent in an amount at least sufficient to remove the inorganic polyvalent cations (e. g., calcium and magnesium) from the solution. Usually an excess of chelating agent is used to insure complete separation of these ions. The chelating agent used in this step of the process may be an α-amino acid, such as ethylene diamine tetracetic acid, triglycine (the triacetic acid substitution product of ammonia), glycine, sarcosine, and polymers of (ethylene-diimino) diacetic acid (U. S. Patent No. 2,564,092); or it may be any of the other types of chelating agents for sequestering calcium and magnesium, such as the phosphates (i. e., sodium hexametaphosphate). Ethylenediamine tetracetic acid has been found to be especially effective in the process and is preferred.

The streptomycin is then adsorbed on a second column (or series of columns) containing a weak acid cation exchange resin, such as one hereinbefore described. By this step, the streptomycin (and some of the alkali metals present) are adsorbed on the second cation exchange resin, while any polyvalent material in its chelated form passes through the resin with the effluent. The effluent containing the chelated sequestering agent may be treated to recover that agent for reuse. This may be done with ethylene-diamine tetracetic acid by adjusting the hydrogen ion concentration of the effluent to pH of about 2 with an acid, such as nitric acid, separating the precipitated agent, and redissolving in sodium hydroxide to form the soluble salt.

The streptomycin is then eluted from the second column (or series of columns) by means of a dilute acid, such as those hereinbefore described, and preferably sulfuric acid. This elution is preferably carried out fractionally, initially at a pH of about 6 to remove impurities (especially sodium ions), then finally at a pH of about 2 to elute the streptomycin.

The resultant eluate containing streptomycin can then be further treated, if desired, to remove any remaining sodium salt or other ionic compounds. To remove these contaminants, the streptomycin solution is neutralized and deionized by means of ion exchangers. This may be done by neutralization with a weak base anion exchanger, such as IR-4B (a modified amine type resin), followed by deionization using a monobed containing both cationic and anionic exchangers as, for example, equal volumes of a nuclear sulfonic cation exchanger (IR-120) and an amine anion exchanger (IR-4B). Or the neutralization and deionization may be effected simultaneously by allowing the solution to pass through a monobed containing adequate quantities of exchangers for both steps—as, for example, a monobed consisting of one volume of a nuclear sulfonic cation exchanger (e. g., IR-120) and two volumes of an amine anion exchanger (e. g., IR-4B).

The resulting product, either with or without this further treatment, may be either freeze-dried (i. e., frozen followed by removal of water by sublimation) and/or treated to obtain the dihydroform, and these products used per se or in various pharmaceutical forms.

It is pointed out that the process of this invention, to be most effective, requires the regulation of certain conditions. Thus, in multi-stage operation, elution of streptomycin from the initial ion exchange column is not begun until a substantial amount of the antibiotic has been adsorbed on the column and preferably, until the column has become substantially saturated with streptomycin.

Furthermore, the stage of the process for addition of chelating agent is important. Thus, it has been found that the desired purification is obtained when the chelating agent is added to the eluate obtained from the initial adsorption but that addition of this agent to the whole broth under similar conditions does not effect a comparable purification.

Contamination of the streptomycin by microorganisms may occur during the purification process. Therefore, as a preventative measure, a bacteriostatic agent, preferably formaldehyde, may be added to the fermentation broth. Other agents, utilizable for this purpose include chlorinated or alkylated phenols [e. g., 2,2'-methylenebis-3.4.6-trichlorophenol (Hexachlorophene), pentachlorophenol, sodium salt (Dowicide G)], phenylmercuric salts (e. g., nitrate, chloride, etc.) and sodium (ethylmercuri) thiosalicylate [Merthiolate]. Mixtures of these agents may be also used as, for example, a mixture of sodium (ethylmercuri) thiosalicylate and pentachlorophenol, sodium salt.

The following example is illustrative of the invention:

*Example*

A series of four 4" diameter glass columns 8' high is set up. The top of each column is provided with an elbow head, and a 60-mesh screen is installed in the face parallel to the longitudinal axis of the column. A 3" diameter turbine agitator is provided and located ½" behind and in a plane parallel to the screen. The turbine agitator is driven by a shaft which enters the elbow through a stuffing box located directly opposite the screen. Each column is charged with 30" of IRC-50 resin supported on a 12" graded gravel bed. The resin in each column is placed in the sodium cycle by passing 30 liters of 3% sodium hydroxide solution upflow at a rate of 1 liter/minute. The regenerant is displaced upflow with 20 liters of water at the same rate. During the regeneration and washing, a top outlet below the screen is used to discharge the effluent. Three of the columns are connected with hoses for series upflow operation, using the top outlet beyond the screen. The agitator is started in each column, and water is fed upflow at the rate of 2 liters/minute.

When the resin in each column is completely suspended, a whole broth resulting from the propagation of a streptomycin-producing strain of Streptomyces griseus in the usual manner, which had been screened to 100 mesh and diluted with water to a viscosity of 25–50 centipoises is cut in. The flow of broth is continued until the spent from the last column assayed in excess of 500 u./ml. At this point, the flow of broth is discontinued and 20 liters of water is fed upflow through the system at the rate of 2 liters/minute. The first column is then disconnected from the series and the absorption resumed with a freshly regenerated column tied on the end. The loaded column is washed upflow with water until the effluent is clear and colorless, using the top outlet below the screen.

The liquid level in the loaded column is lowered by drawing off 4 liters from the bottom. A solution of 900 ml. of nitric acid made up to 5 liters with water is added to a pot and recycled upflow through the column at a rate of 2 liters per minute. Additional nitric acid is added as necessary to bring the pH in the 2.0–2.5 range. Recycling is continued for ½ hour after no further addition of acid is required to maintain the pH at 2.0–2.5. The column is then displaced downflow with water to a collected volume of 20 liters. The eluate is immediately adjusted to pH 5.8±0.3 with 50% sodium hydroxide solution. A second elution is conducted by adding 1 liter of water to the pot, recycling upflow at the rate of 2 liters/minute and gradually adding nitric acid to pH 2.0–2.5. Recycling is continued for ½ hour after no further acid addition is required to maintain the pH at 2.0–2.5. The column is displaced downflow with water to a collected volume of 20 liters. The second elution is combined with the first elution, and the pH is adjusted to 6.0±.1 with 50% sodium hydroxide solution. During this and subsequent treatments, the temperature is maintained at 20–25° C.

The broth eluate pool is agitated with 120 g. of activated carbon for ½ hour. Filtration is conducted on a 10" lapp filter, using 60 g. of admixed filter aid. The filter is washed forward with 20 liters of water. The carbon treated eluate is adjusted to pH 9.0–9.3 with 10% sodium carbonate solution and filtered on a 10" lapp filter using 60 g. of admixed filter aid. The filter is washed forward with 20 liters of water. The sodium carbonate treated broth eluate is agitated with 1750 g. of ethylenediamine tetracetic acid. Ethylenediamine tetracetic acid solubilization is completed by adding 50% sodium hydroxide solution, and the pH is adjusted to 7.5±0.1.

A series of five 3" diameter glass columns 8' high are set up. Each column is charged with 30" of IRC-50 resin supported on a 12" graded gravel bed. The resin in each column is placed in the sodium cycle by passing 12.5 liters of 2% sodium hydroxide solution upflow at the rate of 550 ml./minute. The regenerant is displaced upflow with 15 liters of distilled water at the same rate. Four of the columns are connected with hoses for series upflow operation. The treated broth eluate is diluted to 8500±500 u./cc. with distilled water and fed upflow through the columns at a rate of 600 ml./minute. The feeding is continued until the effluent from the last column gives a positive test with phosphotungstic acid solution. At this point, the feed is discontinued and the columns are washed upflow in series with 20 liters of distilled water at the rate 600 ml./minute. The first column is then disconnected from series. A freshly regenerated column is tied on the end of the remaining three columns and absorption is resumed. The loaded column is downwashed to the sewer with 20 liters of distilled water at the rate of 1 liter/minute. The spent column feed is collected for recovery of the sequestering agent.

A precut elution is first conducted. One liter of water and 50 ml. of 25% $H_2SO_4$ is added to a pot and recycled upflow through the loaded column at a rate of 1 liter per minute. Further acid additions are made to bring the pH in the range of 6.0±0.1. The recycling is continued for a period totaling 6 hours. The precut elution is displaced downflow with 20 liters of distilled water at the rate of 1 liter/minute. Approximately 5% of the total activity on the resin is removed by the precut elution. This activity is recovered by recycling through the broth columns. The main elution is made by placing 1 liter of distilled water and 800 ml. of 25% $H_2SO_4$ in a pot and recycling upflow through the column at a rate of 1 liter/minute. Further acid additions are made to bring the pH in the range of 2.0-2.4. Recycling is continued for ½ hour after no further addition of acid is required to maintain the pH at 2.0-2.4. The eluate is displaced downflow with distilled water to a volume of 1.5 liters. The eluate is neutralized to pH 6.5±.2 with IR-4B resin in the hydroxide cycle. A clean-up elution is conducted by placing 1 liter of distilled water in a pot, recycling upflow through the column at the rate of 1 liter/minute and adding 25% $H_2SO_4$ to pH 2.0-2.4. Recycling is continued for ½ hour after no further addition of acid is required to maintain the pH at 2.0-2.4. The eluate is displaced downflow with distilled water to a pool volume of 15 liters. The clean-up elution is neutralized to pH 7.5±.1 with sodium hydroxide solution and recycled through the second series columns by combining with the treated broth column eluate.

The invention may be otherwise variously embodied within the scope of the appended claims.

We claim:

1. A process for purifying streptomycin, which comprises adsorbing a whole streptomycin-containing broth on a first cation exchange resin, eluting the adsorbed streptomycin therefrom, adding to the eluate an alkaline-earth-metal sequestering agent in quantity at least sufficient to sequester the alkaline-earth-metal ions, adsorbing the streptomycin from the resulting solution on a second cation exchange resin, and then eluting a purified streptomycin from said second cation exchange resin.

2. The process of claim 1, wherein the cation exchange resins derive their exchange capacity essentially from carboxylic groups.

3. A process for purifying streptomycin, which comprises adsorbing a whole streptomycin-containing broth on a first column containing a cation exchange resin, eluting the adsorbed streptomycin from the column with a mineral acid at a pH about 1 to 3, adjusting the eluate to a pH at least about 8, adding to the eluate an alkaline-earth-metal sequestering agent in quantity at least sufficient to sequester the alkaline-earth-metal ions, adsorbing the streptomycin from the resulting solution on a second column containing a cation exchange resin, and then preferentially eluting a purified streptomycin from said second column.

4. The process of claim 3 wherein the cation exchange resins derive their exchange capacity essentially from carboxylic groups.

5. The process of claim 4 wherein the first column is allowed to become substantially saturated with streptomycin before elution.

6. The process of claim 5 wherein the second column is eluted first with aqueous acid at pH about 6, then at pH about 2 to obtain the purified streptomycin.

7. The process of claim 6, wherein the whole streptomycin-containing broth is obtained from the propagation of a streptomycin-producing strain of *Streptomyces griseus*.

8. A process for purifying streptomycin, which comprises adsorbing the streptomycin from a whole streptomycin-containing broth by passage through a first series of columns each containing a cation exchange resin, eluting the adsorbed streptomycin from each column, treating the total eluate with an alkaline-earth-metal sequestering agent in quantity at least sufficient to sequester the alkaline-earth-metal ions, adsorbing the streptomycin from the treated eluate by passage through a second series of columns, each containing a cation exchange resin, then preferentially eluting to obtain a purified streptomycin.

9. The process of claim 8, in which the cation exchange resins derive their exchange capacity essentially from carboxylic groups.

10. The process of claim 9, in which elution from each of the first series of columns is not begun until that column is substantially saturated with streptomycin.

11. The process of claim 10, in which each column of the second series of columns is brought to equilibrium with aqueous acid at a pH of about 6 prior to elution of the streptomycin.

References Cited in the file of this patent

UNITED STATES PATENTS 2,541,420    Howe _____ Feb. 13, 1951